United States Patent Office 2,777,872
Patented Jan. 15, 1957

2,777,872
UNSATURATED ORGANIC COMPOUNDS

Comer Drake Shacklett, Roselle, N. J., assignor to E. I. du Pont de Nemours and Company, Wilmington, Del., a corporation of Delaware No Drawing. Application November 2, 1953, Serial No. 389,873

19 Claims. (Cl. 260—482)

This invention relates to ethylenically unsaturated organic compounds. More particularly it relates to ethylenically unsaturated amides containing quaternary ammonium and carboxylate groups. Still more particularly it relates to ethylenically unsaturated amides containing a betaine group and certain of their derivatives. Still more particularly it relates to N-substituted amides of unsubstituted acrylic acid and alpha-hydrocarbon-substituted acrylic acid containing a betaine group and certain of their derivatives. The invention further relates to processes of preparing such compounds.

An object of this invention is to provide a new class of ethylenically unsaturated amides which are capable of addition-polymerization. Another object is to provide such compounds which form addition polymers capable of forming hard films. A related object is to provide such compounds which can be readily polymerized to form colloids having hydrophilic properties that are useful as gelatin substitutes. Yet another object is to provide a new class of ethylenically unsaturated amides containing a betaine group. A further object is to provide processes for preparing such amides from available chemical compounds. Still other objects will be apparent from the following description of the invention.

The above objects are accomplished in accordance with the present invention which in its broader aspects provides N-substituted amides of acrylic acid and alpha-hydrocarbon-substituted acids of the general formula:

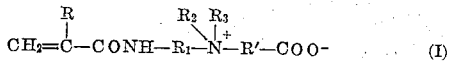
(I)

where R is a member taken from the group consisting of hydrogen, alkyl radicals of 1 to 3 carbon atoms, phenyl, and cyclohexyl; R₁ is a divalent saturated aliphatic hydrocarbon radical of not more than 6 carbon atoms, R' is a divalent saturated aliphatic hydrocarbon radical of 1 to 4 carbon atoms; and R₂ and R₃ are the same or different alkyl radicals of 1 to 3 carbon atoms; preferably R₁ is a polymethylene radical of 2 to 6 carbon atoms.

Amides of the type covered by Formula I wherein R' is a divalent, saturated, aliphatic hydrocarbon radical having the configuration —CHR"—CHR'"— in which R" and R'" may be hydrogen, methyl or ethyl and the other symbols have the values assigned above can be made in accordance with one aspect of this invention by the reaction of (1) a dialkylaminoalkyl-acrylamide or α-hydrocarbon substituted-acrylamide having a hydrogen atom attached to the amido nitrogen atom with (2) a β-lactone, preferably in the presence of an inert liquid diluent which may be a solvent for said reactants, at a temperature from —20 to 40° C. and preferably between 0° C. and 20° C. in the substantial absence of water including water vapor. The precipitated amide is then recovered under moisture-free conditions. Suitable inert diluents include diethyl ether, acetone, methylethyl ketone, tetrahydrofuran and dioxane.

Certain derivatives of amides of the type covered by general Formula I wherein R' is a divalent, saturated, aliphatic hydrocarbon radical having the configuration —CHR₄— where R₄ is hydrogen, methyl, ethyl, propyl or isopropyl, and the other symbols have the values assigned above can be made by reacting (a) a dialkyl-aminoalkyl-acrylamide or α-hydrocarbon-substituted-acrylamide having a hydrogen atom attached to the amido nitrogen atom with (b) a lower alkyl ester of an α-halogen-substituted fatty acid preferably in the presence of an inert liquid diluent of the type described above at a temperature from —20° C. to 60° C. and preferably 20° C. to 30° C. When temperatures above 60° C. are used it is best to add an addition polymerization inhibitor to prevent polymerization. The resulting derivatives of the betaines have the general formula:

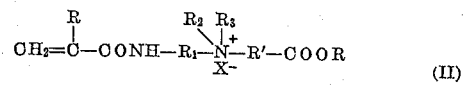
(II)

wherein R₅ may be alkyl of 1 to 4 carbon atoms e. g. methyl, ethyl, propyl, isopropyl or n-butyl and X is Cl⁻, Br⁻ or I⁻ and the other symbols have the values assigned previously. They may be removed from the reaction mixture by filtration and may then be subjected to hydrolysis in aqueous solutions in the presence of a suitable base. This hydrolysis reaction can be carried out at any time. For example, in the preparation of polymers containing betaine groups this latter step may be carried out before or after the polymerization reaction.

The betaines and betaine derivatives of Formulae I and II are non-resinous solid compounds which can be isolated in substantially pure state. At normal temperatures they are crystalline and soluble in water, lower aliphatic alcohols, e. g., methanol and ethanol, and polar organic solvents, e. g., dimethylformamide and, in general, they are insoluble in non-polar organic liquids. The compounds are useful in the preparation of various other organic compounds and are particularly useful for the preparation of polymers and copolymers by an addition-polymerization reaction. The individual compounds or mixtures of two or more of them can be polymerized to form polymers or copolymers, or they may be admixed with a still different ethylenically unsaturated compound, e. g., acrylic or methacrylic acid or their esters, a vinyl compound or a vinylidene compound to form copolymers. The resulting polymers, including copolymers, have film-forming properties and can be cast, extruded or coated to form hard, flexible films, fibers or layers. The homopolymers and copolymers containing a substantial percentage of the above betaine components have hydrophilic properties and are useful as gelatin substitutes.

The invention will be further illustrated but is not intended to be limited by the following examples wherein the parts stated are parts by weight.

EXAMPLE I

*Betaines from propiolactone and N-dialkylaminoalkyl-acrylamides or alpha-substituted-acrylamides*

To a stirred ice-cooled solution of one molar part of the respective aminoamide given in Table I below, dissolved in 212 parts of diethyl ether, 238 parts of acetone, or 242 parts of methylethyl ketone, there is added, dropwise during a period of 1.5 to 2 hours, one molar part of propiolactone dissolved in ⅔ of the quantity of the same solvent employed for the aminoamide. The mixture is allowed to stand for 24 hours and the resulting crystalline betaine-amide is removed by filtration in a moisture-free atmosphere, washed several times with fresh portions of acetone or diethylether and dried in the absence of moist air, preferably in vacuo. The respective compounds are recovered in the yields listed and have the names and properties listed in the following table:

TABLE I

| Aminoamide | Betaine-Amide | Yield, Percent | Melting Point, °C |
|---|---|---|---|
| 3-Methacrylamidopropyl-dimethylamine | N, 3-Methacrylamidopropyl-N,N-dimethyl-β-amino-propionate betaine | 95 | 116–116.5 |
| 2-Methacrylamidoethyl-dimethylamine | N, 2-Methacrylamidoethyl-N,N-dimethyl-β-amino-propionate betaine | 95 | 108–108.5 |
| 3-Acrylamidopropyldimethylamine | N, 3-Acrylamidopropyl-N,N-dimethyl-β-amino-propionate betaine | 83 | 118–121 |
| 2-Acrylamidoethyldimethylamine | N, 2-Acrylamidoethyl-N,N-dimethyl-β-amino-propionate betaine | | 111–112 |

EXAMPLE II

*Betaine derivatives prepared from N-dialkylaminoalkyl-acrylamides or α-substituted-acrylamides and halogenated lower aliphatic acid esters*

To a solution of one molar part of the respective aminoamide given in Table II dissolved in 396 parts of acetone there was added 1.1 molar part of the respective halogenated ester, as listed in said table, dissolved in 198 parts of acetone and the resulting mixture was stirred thoroughly and allowed to stand for a period of from several hours to several days, depending on the rapidity of precipitation of the crystalline derivative. When precipitation was complete the white crystalline product was removed by filtration in a moisture-free atmosphere, washed with several portions of fresh solvent and dried in a moisture-free atmosphere, preferably in vacuo.

TABLE II

| Aminoamide | Halogenated Ester | Betaine Derivative | Yield, Percent | Melting Point, °C |
|---|---|---|---|---|
| 2-Methacrylamidoethyl dimethylamine | Methyl Chloroacetate | Carbomethoxymethyl 2-Methacrylamidoethyl Dimethylammonium Chloride | 75 | 155–157 |
| Do | Ethyl Chloroacetate | Carboethoxymethyl 2-Methacrylamidoethyl Dimethylammonium Chloride | 75 | 126–127 |
| Do | Methyl Bromoacetate | Carbomethoxymethyl 2-Methacrylamidoethyl Dimethylammonium Bromide | 84 | 147–148 |
| Do | Ethyl Bromoacetate | Carboethoxymethyl 2-Methacrylamidoethyl Dimethylammonium Bromide | 94 | 106–107 |
| Do | Methyl Iodoacetate | Carbomethoxymethyl 2-Methacrylamidoethyl Dimethylammonium Iodide | 75 | 106–107 |
| Do | Ethyl Iodoacetate | Carboethoxymethyl 2-Methacrylamidoethyl Dimethylammonium Iodide | 34 | 92–93 |
| Do | Ethyl α-Bromopropionate | 1-Carboethoxyethyl 2-Methacrylamidoethyl Dimethylammonium Bromide | 75 | 110–111 |
| Do | Methyl α-Iodopropionate | 1-Carbomethoxyethyl 2-Methacrylamidoethyl Dimethylammonium Iodide | 63 | 114–114.5 |
| 2-Methacrylamidoethyl diethylamine | Methyl Chloroacetate | Carbomethoxymethyl 2-Methacrylamidoethyl Diethylammonium Chloride | 27 | 148–149 (dec.) |
| Do | Methyl Bromoacetate | Carbomethoxymethyl 2-Methacrylamidoethyl Diethylammonium Bromide | 88 | 134–135 |
| Do | Ethyl Bromoacetate | Carboethoxymethyl 2-Methacrylamidoethyl Diethylammonium Bromide | 60 | 121–122 |
| Do | Methyl Iodoacetate | Carbomethoxymethyl 2-Methacrylamidoethyl Diethylammonium Iodide | 70 | 97–98 |
| Do | Ethyl Iodoacetate | Carboethoxymethyl 2-Methacrylamidoethyl Diethylammonium Iodide | 85 | 114–115 |
| 3-Methacrylamidopropyl dimethylamine | Methyl Chloroacetate | Carbomethoxymethyl 3-Methacrylamidopropyl Dimethylammonium Chloride | 73 | 129–130 |
| Do | Ethyl Chloroacetate | Carboethoxymethyl 3-Methacrylamidopropyl Dimethylammonium Chloride | 90 | 147–148 |
| Do | Methyl Bromoacetate | Carbomethoxymethyl 3-Methacrylamidopropyl Dimethylammonium Bromide | 92 | 131–132 |
| Do | Ethyl Bromoacetate | Carboethoxymethyl 3-Methacrylamidopropyl Dimethylammonium Bromide | 86 | 125–126 |
| Do | Methyl Iodoacetate | Carbomethoxymethyl 3-Methacrylamidopropyl Dimethylammonium Iodide | 91 | 123–124 |
| Do | Ethyl Iodoacetate | Carboethoxymethyl 3-Methacrylamidopropyl Dimethylammonium Iodide | 70 | 96–97 |
| Do | Ethyl α-Bromopropionate | 1-Carboethoxyethyl 3-Methacrylamidopropyl Dimethylammonium Bromide | 56 | 93–94 |
| Do | Methyl α-Iodopropionate | 1-Carbomethoxyethyl 3-Methacrylamidopropyl Dimethylammonium Iodide | 63 | 119–120 |
| 3-Methacrylamidopropyl diethylamine | Methyl Bromoacetate | Carbomethoxymethyl 3-Methacrylamidopropyl Diethylammonium Bromide | 91 | 167.5–168 |
| Do | Ethyl Bromoacetate | Carboethoxymethyl 3-Methacrylamidopropyl Diethylammonium Bromide | 70 | 114–115 |
| Do | Methyl Iodoacetate | Carbomethoxymethyl 3-Methacrylamidopropyl Diethylammonium Iodide | 81 | 159–160 |
| Do | Ethyl Iodoacetate | Carboethoxymethyl 3-Methacrylamidopropyl Diethylammonium Iodide | 85 | 129–130 |
| 2-Acrylamidoethyl dimethylamine | Methyl Chloroacetate | Carbomethoxymethyl 2-Acrylamidoethyl Dimethylammonium Chloride | 96 | 149–150 (dec.) |
| Do | Methyl Bromoacetate | Carbomethoxymethyl 2-Acrylamidoethyl Dimethylammonium Bromide | 88 | 129–130 |
| Do | Ethyl Bromoacetate | Carboethoxymethyl 2-Acrylamidoethyl Dimethylammonium Bromide | 48 | 75–76 |
| Do | Ethyl Iodoacetate | Carboethoxymethyl 2-Acrylamidoethyl Dimethylammonium Iodide | 28 | 79–81 |
| Do | Methyl α-Iodopropionate | 1-Carbomethoxyethyl 2-Acrylamidoethyl Dimethylammonium Iodide | 39 | 90–91 |
| 2-Acrylamidoethyl diethylamine | Methyl Chloroacetate | Carbomethoxymethyl 2-Acrylamidoethyl Diethylammonium Chloride | 85 | 155–156 |
| Do | Methyl Bromoacetate | Carbomethoxymethyl 2-Acrylamidoethyl Diethylammonium Bromide | 61 | 145–146 |
| Do | Ethyl Bromoacetate | Carboethoxymethyl 2-Acrylamidoethyl Diethylammonium Bromide | 54 | 97–98 |
| Do | Ethyl Iodoacetate | Carboethoxymethyl 2-Acrylamidoethyl Diethylammonium Iodide | 60 | 107–107.5 |
| 3-Acrylamidopropyl dimethylamine | Methyl Chloroacetate | Carbomethoxymethyl 3-Acrylamidopropyl Dimethylammonium Chloride | 95 | 149–150 (dec.) |
| Do | Methyl Bromoacetate | Carbomethoxymethyl 3-Acrylamidopropyl Dimethylammonium Bromide | 90 | 150–150.5 |
| Do | Ethyl Bromoacetate | Carboethoxymethyl 3-Acrylamidopropyl Dimethylammonium Bromide | 90 | 132.5–133 |
| Do | Methyl Iodoacetate | Carbomethoxymethyl 3-Acrylamidopropyl Dimethylammonium Iodide | 91 | 137–138 |

TABLE II—Continued

| Aminoamide | Halogenated Ester | Betaine Derivative | Yield, Percent | Melting Point, °C. |
|---|---|---|---|---|
| 3-Acrylamidopropyl dimethylamine | Ethyl α-Bromopropionate | 1-Carboethoxyethyl 3-Acrylamidopropyl Dimethylammonium Bromide. | 77 | 143–144 |
| Do | Methyl α-Iodopropionate | 1-Carbomethoxyethyl 3-Acrylamidopropyl Dimethylammonium Iodide. | 81 | 117–118 |
| 3-Acrylamidopropyl diethylamine | Ethyl Bromoacetate | Carboethoxymethyl 3-Acrylamidopropyl Diethylammonium Bromide. | 98 | 122–123 |
| Do | Ethyl Iodoacetate | Carboethoxymethyl 3-Acrylamidopropyl Diethylammonium Iodide. | 75 | 111–112 |

*Betaines from betaine derivatives described in Example II*

A solution of 0.1 molar part of the respective betaine derivative listed in Table III, dissolved in 100 parts of water is treated with a sufficient quantity of a solution of a base, e. g., NaOH dissolved in water to cause the pH of the resulting mixed solution to rise to a value between 10.0 and 12.0 and to remain within this range for a period of at least one hour. The quantity of aforementioned base solution required is somewhat more than an equimolecular amount of the betaine derivative employed, i. e., in the examples described somewhat more than 0.1 molar part.

When a period of about one hour has elapsed since the addition of the base solution sufficient dilute aqueous solution of an acid, e. g., hydrochloric acid, sulfuric acid, or acetic acid, is added to cause the pH of the mixed solution to be lowered to a value between 6.5 and 7.5. There is thus prepared a neutral solution of a polymerizable, betaine-containing acrylamide or α-substituted acrylamide listed in Table III suitable for use directly in making homopolymers and copolymers or other compounds.

The betaines may be isolated by a procedure as follows: To the neutral solution of the betaine prepared as described above, there is added a suitable polymerization inhibitor and the water is evaporated under reduced pressure at room temperature. The residue is then dried completely in vacuo over a strong desiccating agent, e. g., phosphorous pentoxide, and extracted with a suitable solvent, e. g., acetonitrile or dimethylformamide at a temperature from 40 to 80° C. When this extract is cooled the crystalline betaine is deposited.

TABLE III

| Betaine Derivative | Betaine Produced by Hydrolysis |
|---|---|
| Carbomethoxymethyl 2-Methacrylamidoethyl Dimethylammonium Chloride. | N,2-Methacrylamidoethyl-N,N-dimethylaminoacetate betaine. |
| Carboethoxymethyl 2-Methacrylamidoethyl Dimethylammonium Chloride. | Do. |
| Carbomethoxymethyl 2-Methacrylamidoethyl Dimethylammonium Bromide. | Do. |
| Carboethoxymethyl 2-Methacrylamidoethyl Dimethylammonium Bromide. | Do. |
| Carbomethoxymethyl 2-Methacrylamidoethyl Dimethylammonium Iodide. | Do. |
| Carboethoxymethyl 2-Methacrylamidoethyl Dimethylammonium Iodide. | Do. |
| 1-Carboethoxyethyl 2-Methacrylamidoethyl Dimethylammonium Bromide. | N,2-Methacrylamidoethyl-N,N-dimethyl-α-aminopropionate betaine. |
| 1-Carbomethoxyethyl 2-Methacrylamidoethyl Dimethylammonium Iodide. | Do. |
| Carbomethoxymethyl 2-Methacrylamidoethyl Diethylammonium Chloride. | N-2-Methacrylamidoethyl-N,N-diethylaminoacetate betaine. |
| Carboethoxymethyl 2-Methacrylamidoethyl Diethylammonium Bromide. | Do. |
| Carbomethoxymethyl 2-Methacrylamidoethyl Diethylammonium Bromide. | Do. |
| Carbomethoxymethyl 2-Methacrylamidoethyl Diethylammonium Iodide. | Do. |
| Carboethoxymethyl 2-Methacrylamidoethyl Diethylammonium Iodide. | Do. |

TABLE III—Continued

| Betaine Derivative | Betaine Produced by Hydrolysis |
|---|---|
| Carbomethoxymethyl 3-Methacrylamidopropyl Dimethylammonium Chloride. | N,3-Methacrylamidopropyl-N,N-dimethylaminoacetate betaine. |
| Carboethoxymethyl 3-Methacrylamidopropyl Dimethylammonium Chloride. | Do. |
| Carbomethoxymethyl 3-Methacrylamidopropyl Dimethylammonium Bromide. | Do. |
| Carboethoxymethyl 3-Methacrylamidopropyl Dimethylammonium Bromide. | Do. |
| Carbomethoxymethyl 3-Methacrylamidopropyl Dimethylammonium Iodide. | Do. |
| Carboethoxymethyl 3-Methacrylamidopropyl Dimethylammonium Iodide. | Do. |
| 1-Carboethoxyethyl 3-Methacrylamidopropyl Dimethylammonium Bromide. | N,3-Methacrylamidopropyl-N,N-dimethyl-α-aminopropionate betaine. |
| 1-Carbomethoxyethyl 3-Methacrylamidopropyl Dimethylammonium Iodide. | Do. |
| Carbomethoxymethyl 3-Methacrylamidopropyl Diethylammonium Bromide. | N,3-Methacrylamidopropyl-N,N-diethylaminoacetate betaine. |
| Carboethoxymethyl 3-Methacrylamidopropyl Diethylammonium Bromide. | Do. |
| Carbomethoxymethyl 3-Methacrylamidopropyl Diethylammonium Iodide. | Do. |
| Carboethoxymethyl 3-Methacrylamidopropyl Diethylammonium Iodide. | Do. |
| Carbomethoxymethyl 2-Acrylamidoethyl Dimethylammonium Chloride. | N,2-Acrylamidoethyl-N,N-dimethylaminoacetate betaine. |
| Carbomethoxymethyl 2-Acrylamidoethyl Dimethylammonium Bromide. | Do. |
| Carboethoxymethyl 2-Acrylamidoethyl Dimethylammonium Bromide. | Do. |
| Carboethoxymethyl 2-Acrylamidoethyl Dimethylammonium Iodide. | Do. |
| 1-Carbomethoxyethyl 2-Acrylamidoethyl Dimethylammonium Iodide. | N,2-Acrylamidoethyl-N,N-dimethyl-α-aminopropionate betaine. |
| Carbomethoxymethyl 2-Acrylamidoethyl Diethylammonium Chloride. | N,2-Acrylamidoethyl-N,N-diethylaminoacetate betaine. |
| Carboethoxymethyl 2-Acrylamidoethyl Diethylammonium Bromide. | Do. |
| Carbomethoxymethyl 2-Acrylamidoethyl Diethylammonium Bromide. | Do. |
| Carboethoxymethyl 2-Acrylamidoethyl Diethylammonium Iodide. | Do. |
| Carbomethoxymethyl 3-Acrylamidopropyl Dimethylammonium Chloride. | N,3-Acrylamidopropyl-N,N-dimethylaminoacetate betaine. |
| Carbomethoxymethyl 3-Acrylamidopropyl Dimethylammonium Bromide. | Do. |
| Carboethoxymethyl 3-Acrylamidopropyl Dimethylammonium Bromide. | Do. |
| Carbomethoxymethyl 3-Acrylamidopropyl Dimethylammonium Iodide. | Do. |
| 1-Carboethoxyethyl 3-Acrylamidopropyl Dimethylammonium Bromide. | N,3-Acrylamidopropyl-N,N-dimethyl-α-aminopropionate betaine. |
| 1-Carbomethoxyethyl 3-Acrylamidopropyl Dimethylammonium Iodide. | Do. |
| Carboethoxymethyl 3-Acrylamidopropyl Diethylammonium Bromide. | N,3-Acrylamidopropyl-N,N-diethylaminoacetate betaine. |
| Carboethoxymethyl 3-Acrylamidopropyl Diethylammonium Iodide. | Do. |

In the practice of this invention there may be used any N-dialkylaminoalkylamide of an α-methylene organic monocarboxylic acid, preferably aliphatic, and any lactone of a β-hydroxy organic monocarboxylic acid, preferably aliphatic or any lower aliphatic ester of an α-halogenated organic monocarboxylic acid, preferably aliphatic, in which the halogen is chlorine, bromine, or iodine. In addition to the N-dialkylaminoalkylamides of acrylic acid and α-methyacrylic acid used in the examples, those of α-ethylacrylic acid, α-propylacrylic acid, α-isopropylacrylic acid, α-phenylacrylic acid, and α-cyclohexylacrylic acid may be used. In addition to the acrylic or α-substituted acrylic amides of dialkylaminoethylamine and of dialkylaminopropylamine described in the examples, there may be used those amides of dialkylamino-isopropylamine, -n-butylamine, -n-amylamine, and -n-hexylamine, and in addition to the dimethylaminoalkylamides and diethylaminoalkylamides used in the examples and above there may be used the corresponding methylethylaminoalkylamides, and methyl propylaminoalkylamides.

The N-dialkylaminoalkyl-acrylamides and α-substituted acrylamides can be made by the methods described in U. S. Patents 2,311,548 and 2,595,907 and by the method of Helv. Chim. Acta, 34,875 (1951), in which acrylic or an α-substituted acrylic acid is used as the amino acid.

In addition to propiolactone given in the examples one may use β-butyrolactone, β-isobutyrolactone, β-valerolactone, etc. In addition to the halogenated aliphatic esters given in the examples, one may use the methyl, ethyl, propyl, isopropyl, and butyl esters of α-bromobutyric acid, α-iodopropionic acid, α-iodobutyric acid, iodoacetic acid, α-chloropropionic acid, α-chlorobutyric acid, etc.

The reaction of the dialkylaminoalkyl-acrylamides or α-substituted acrylamides with a β-lactone or with a halogenated aliphatic ester may be carried out in bulk or in a suitable diluent. The diluent can be a liquid in which the reactants are soluble and to which they are inert, and in which the product is insoluble and to which it is inert, such as diethylether, dipropylether, diisopropyl ether, ethyl propyl ether, ethyl isopropyl ether, methyl ethyl ether, methyl isopropyl ether, methyl propyl ether, methyl butyl ether, acetone, methyl ethyl ketone, diethyl ketone, methyl isopropyl ketone, methyl propyl ketone, dioxane, tetrahydrofuran, benzene, toluene, acetonitrile, propionitrile, etc.

The hydrolysis of the ester group in the aforementioned betaine derivatives of the dialkylaminoalkylacrylamides and α-substituted acrylamides may be carried out not only in water as a single solvent but also in mixtures of water with water-miscible organic solvents such as methanol, ethanol, propanol, isopropyl alcohol, tert-butyl alcohol, acetone, methyl ethyl ketone, acetonitrile, tetrahydrofuran, dioxane, etc. Furthermore, during the operation of this reaction the concentration of the betaine derivative may be varied over a very wide range, the exact concentration to be chosen depending on the use to which the product of said reaction is to be put.

Suitable bases for the promotion of this hydrolysis are sodium hydroxide, potassium hydroxide, rubidium hydroxide, cesium hydroxide, barium hydroxide, strontium hydroxide, calcium hydroxide, ammonium hydroxide, etc., and certain of the quaternary ammonium hydroxides and organic amines, e. g., tetramethyl ammonium hydroxide, tetraethyl ammonium hydroxide, piperidine, cyclohexylamine, triethylamine, and trimethylamine.

The temperature of this hydrolysis reaction may be any convenient temperature provided polymerization inhibitors are present but is more satisfactorily room temperature. The time required for completion of this hydrolysis varies with the reactivities of the compounds involved and can be followed exactly by adding the base slowly and making concurrent measurements of the pH of the solution. Additions of base give immediate increases in the pH of the solution. Up until the time of completion of the hydrolysis reaction the pH will drift back to lower values. When the reaction is complete the pH will cease to drift downward and will remain at its initial high value produced by the addition of alkali.

When the hydrolysis reaction is complete, acid may or may not be used to neutralize the resulting solution, depending on the use to which it is to be put. If acid is used it may be any of the common organic or inorganic acids such as hydrochloric acid, hydrobromic acid, hydriodic acid, sulfuric acid, phosphoric acid, trichloracetic acid, chloroacetic acid, acetic acid, propionic acid, p-toluene-sulfonic acid, benzene sulfonic acid, methanesulfonic acid, carbonic acid, etc.

In order for the aforementioned betaine derivatives to be useful in the preparation of homopolymers and copolymers containing the betaine group it is not necessary that the hydrolysis of the ester groups in the aforementioned derivatives be carried out before polymerization.

Moreover, homopolymers and copolymers can be made equally well from the ester derivatives and the hydrolysis of the ester group carried out on the resulting homopolymers or copolymers. The choice as to whether to hydrolyze the ester group in the aforementioned betaine derivatives before or after polymerization or copolymerization will depend upon considerations of convenience in the particular case to be employed. Equally satisfactory polymers are obtained by both procedures.

The betaine-containing and betaine derivative-containing polymerizable amides may also be made by treatment of suitable polymerizable esters with suitable betaine-containing or betaine derivative-containing amines.

The betaine-containing and betaine derivative-containing polymerizable amides of this invention find their chief uses in the preparation of addition copolymers which can be made by organic solvent or aqueous polymerization in the manners described in U. S. Patents 1,933,052, 2,064,565 and 2,160,938. They are also useful in the preparation of many other types of polymers, particularly copolymers because of their ability to confer water-solubility over the entire useful pH range on many polymers which would otherwise be water-insoluble. Among such copolymers are those obtainable by copolymerizing the above-described betaine-containing amides or their derivatives with such polymerizable compounds, as, for example, esters of acrylic and substituted acrylic acids, vinyl esters, vinyl halides, vinylidene halides, styrene, allyl halides, allyl esters, N-acyl allylamine derivatives, esters of maleic, fumaric, aconitic, itaconic, and citraconic acids, etc. They are also useful intermediates in the preparation of other valuable organic chemical compounds. For example, they are useful intermediates in the preparation of substances with physiological activity, surface-active agents, humectants and buffers. The compounds may also be used as halogen acceptors and as intermediates in the preparation of water-soluble dyestuffs.

The compounds which are the subject of this application have numerous advantages. They are easy to prepare in a state of high purity. The materials needed for their preparation are available and relatively inexpensive. Still other advantages will be apparent from the above description of the invention.

The invention claimed is:

1. The compounds of the general formula:

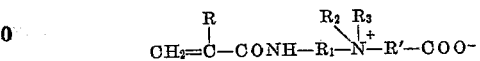

wherein R is a member taken from the group consisting of hydrogen, alkyl radicals of 1 to 3 carbon atoms, phenyl and cyclohexyl, $R_1$ is a saturated aliphatic hydrocarbon radical of 1 to 6 carbon atoms, $R_2$ is an alkyl radical of 1 to 3 carbon atoms, $R_3$ is an alkyl radical of 1 to 3 carbon atoms, and R' is a saturated aliphatic hydrocarbon radical of 2 to 4 carbon atoms.

2. The compounds of the general formula:

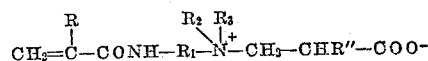

wherein R is a member taken from the group consisting of hydrogen, alkyl radicals of 1 to 3 carbon atoms, phenyl and cyclohexyl, $R_1$ is a saturated aliphatic hydrocarbon radical of 1 to 6 carbon atoms, R₂ is an alkyl radical of 1 to 3 carbon atoms, R₃ is an alkyl radical of 1 to 3 carbon atoms, and R″ is a member taken from the group consisting of hydrogen and alkyl radicals of 1 to 2 carbon atoms.

3. The compounds of the general formula:

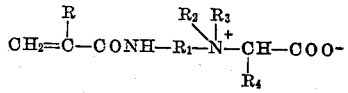

wherein R is a member taken from the group consisting of hydrogen, alkyl radicals of 1 to 3 carbon atoms, phenyl and cyclohexyl, R₁ is a saturated aliphatic hydrocarbon radical of 1 to 6 carbon atoms, R₂ is an alkyl radical of 1 to 3 carbon atoms, R₃ is an alkyl radical of 1 to 3 carbon atoms, and R₄ is a member taken from the group consisting of hydrogen and alkyl radicals of 1 to 2 carbon atoms.

4. The compounds of the general formula:

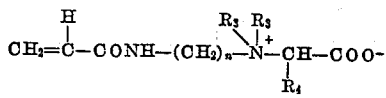

wherein R₂ is an alkyl radical of 1 to 3 carbon atoms, R₃ is an alkyl radical of 1 to 3 carbon atoms, R₄ is a member taken from the group consisting of hydrogen and alkyl radicals of 1 to 2 carbon atoms, and n is a positive integer from 1 to 6.

5. The compounds of the general formula:

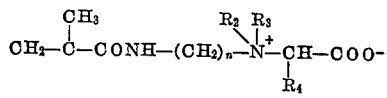

wherein R₂ is an alkyl radical of 1 to 3 carbon atoms, R₃ is an alkyl radical of 1 to 3 carbon atoms, R₄ is a member taken from the group consisting of hydrogen and alkyl radicals of 1 to 2 carbon atoms, and n is a positive integer from 1 to 6.

6. The compounds of the general formula:

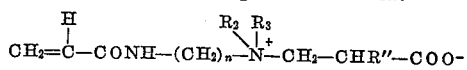

wherein R₂ is an alkyl radical of 1 to 3 carbon atoms, R₃ is an alkyl radical of 1 to 3 carbon atoms, R″ is a member taken from the group consisting of hydrogen and alkyl radicals of 1 to 2 carbon atoms, and n is a positive integer from 1 to 6.

7. The compounds of the general formula:

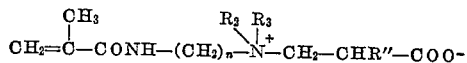

wherein R₂ is an alkyl radical of 1 to 3 carbon atoms, R₃ is an alkyl radical of 1 to 3 carbon atoms, R″ is a member taken from the group consisting of hydrogen and alkyl radicals of 1 to 2 carbon atoms, and n is a positive integer from 1 to 6.

8. The compounds of the general formula:

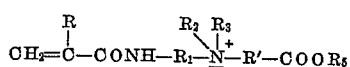

wherein R is a member taken from the group consisting of hydrogen, alkyl radicals of 1 to 3 carbon atoms, R₁ is a saturated aliphatic hydrocarbon radical of 1 to 6 carbon atoms, R₂ is an alkyl radical of 1 to 3 carbon atoms, R₃ is an alkyl radical of 1 to 3 carbon atoms, R₅ is an alkyl radical of 1 to 4 carbon atoms, and R′ is a saturated aliphatic hydrocarbon radical of 2 to 4 carbon atoms, and X is a halogen taken from the group consisting of chlorine, bromine and iodine.

9. The compounds of the general formula:

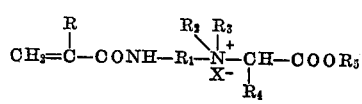

wherein R is a member taken from the group consisting of hydrogen, alkyl radicals of 1 to 3 carbon atoms, R₁ is a saturated aliphatic hydrocarbon radical of 1 to 6 carbon atoms, R₂ is an alkyl radical of 1 to 3 carbon atoms, R₃ is an alkyl radical of 1 to 3 carbon atoms, R₄ is a member taken from the group consisting of hydrogen and alkyl radicals of 1 to 3 carbon atoms, and R₅ is an alkyl radical of 1 to 4 carbon atoms, and X is a halogen taken from the group consisting of chlorine, bromine and iodine.

10. N,3 - methacrylamidopropyl - N,N - dimethyl - β-aminopropionate betaine.

11. N,2 - methacrylamidoethyl - N,N - dimethyl - β - aminopropionate betaine.

12. N,3 - acrylamidopropyl - N,N - dimethyl - β - aminopropionate betaine.

13. N,2 - acrylamidoethyl - N,N - dimethyl - β - aminopropionate betaine.

14. The process which comprises reacting a dialkyl-aminoalkylacrylamide having the general formula:

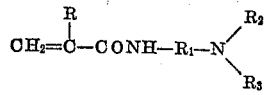

wherein R is a member taken from the group consisting of hydrogen, alkyl radicals of 1 to 3 carbon atoms, phenyl and cyclohexyl, R₁ is a saturated aliphatic hydrocarbon radical of 1 to 6 carbon atoms, R₂ is an alkyl radical of 1 to 3 carbon atoms and R₃ is an alkyl radical of 1 to 3 carbon atoms, with a β-lactone in the presence of an inert liquid diluent at a temperature from −20° C. to +40° C. and in the substantial absence of water.

15. The process which comprises reacting a dialkyl-aminoalkylacrylamide having the general formula:

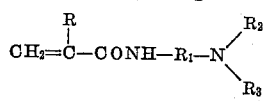

wherein R is a member taken from the group consisting of hydrogen, alkyl radicals of 1 to 3 carbon atoms, phenyl and cyclohexyl, R₁ is a saturated aliphatic hydrocarbon radical of 1 to 6 carbon atoms, R₂ is an alkyl radical of 1 to 3 carbon atoms and R₃ is an alkyl radical of 1 to 3 carbon atoms with a lower alkyl ester of a monohalogen-substituted fatty acid in the presence of an inert liquid diluent at a temperature of −20° C. to +60° C.

16. The process which comprises reacting a dialkyl-aminoalkylacrylamide having the general formula:

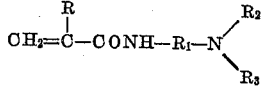

wherein R is a member taken from the group consisting of hydrogen, alkyl radicals of 1 to 3 carbon atoms, phenyl and cyclohexyl, R₁ is a saturated aliphatic hydrocarbon radical of 1 to 6 carbon atoms, R₂ is an alkyl radical of 1 to 3 carbon atoms and R₃ is an alkyl radical of 1 to 3 carbon atoms with a lower alkyl ester of a monohalogen-substituted fatty acid in the presence of an inert liquid diluent at a temperature of −20° C. to +40° C. and hydrolyzing the resulting alkyl ester.

17. The process which comprises reacting a dialkyl-aminoalkylacrylamide having the general formula:

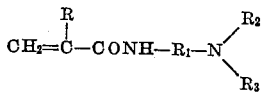

wherein R is a member taken from the group consisting of hydrogen, alkyl radicals of 1 to 3 carbon atoms, phenyl and cyclohexyl, R₁ is a saturated aliphatic hydrocarbon radical of 1 to 6 carbon atoms, R₂ is an alkyl radical of 1 to 3 carbon atoms and R₃ is an alkyl radical of 1 to 3 carbon atoms with a lower alkyl ester of an α-monohalogen-substituted fatty acid in the presence of an inert liquid diluent at a temperature of −20° C. to +60° C. and hydrolyzing the resulting alkyl ester.

18. The process which comprises reacting a dialkyl-aminoalkylacrylamide having the general formula:

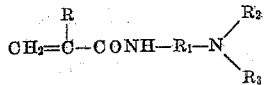

wherein R is a member taken from the group consisting of hydrogen, alkyl radicals of 1 to 3 carbon atoms, phenyl and cyclohexyl, $R_1$ is a saturated aliphatic hydrocarbon radical of 1 to 6 carbon atoms, $R_2$ is an alkyl radical of 1 to 3 carbon atoms and $R_3$ is an alkyl radical of 1 to 3 carbon atoms with a lower alkyl ester of an α-monohalogen-substituted fatty acid of 2 to 5 carbon atoms in the presence of an inert liquid diluent at a temperature of −20° C. to +60° C., hydrolyzing the resulting betaine derivative in an aqueous alkaline solution and neutralizing said solution to a value between pH 6.5 and 7.5.

19. An aqueous solution having a pH between 6.5 and 7.5 obtained by alkaline hydrolysis of the betaine derivative defined in claim 9 and containing a betaine compound of the general formula:

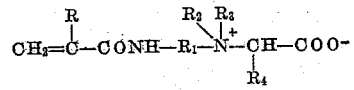

wherein R is a member taken from the group consisting of hydrogen, alkyl radicals of 1 to 3 carbon atoms, phenyl and cyclohexyl, $R_1$ is a saturated aliphatic hydrocarbon radical of 1 to 6 carbon atoms, $R_2$ is an alkyl radical of 1 to 3 carbon atoms, $R_3$ is an alkyl radical of 1 to 3 carbon atoms, and $R_4$ is a member taken from the group consisting of hydrogen and alkyl radicals of 1 to 2 carbon atoms and salts of neutralization.

References Cited in the file of this patent

UNITED STATES PATENTS

| | | |
|---|---|---|
| 2,548,428 | Fiedorek | Apr. 10, 1951 |
| 2,697,656 | Stayner et al. | Dec. 12, 1954 |